Dec. 15, 1970   SHIGERU OTSUKA ET AL   3,547,657
ELECTRICAL PROCESSING OF MARINE PRODUCTS
Filed Feb. 26, 1968   5 Sheets-Sheet 1

*AFTER PROCESSING THE MEAT WAS DIVIDED INTO 4 EQUAL PARTS, WHICH WERE RESPECTIVELY DESIGNATED BY REFERENCE SYMBOLS.

3 × 4 × 16 cm

INVENTOR.
Shigeru Otsuka et al
BY
Attorneys

\* AFTER PROCESSING THE MEAT WAS DIVIDED INTO 4 EQUAL PARTS, WHICH WERE RESPECTIVELY DESIGNATED BY REFERENCE SYMBOLS.

*AFTER PROCESSING THE MEAT WAS DIVIDED INTO 6 EQUAL PARTS, WHICH WERE RESPECTIVELY DESIGNATED BY REFERENCE SYMBOLS.

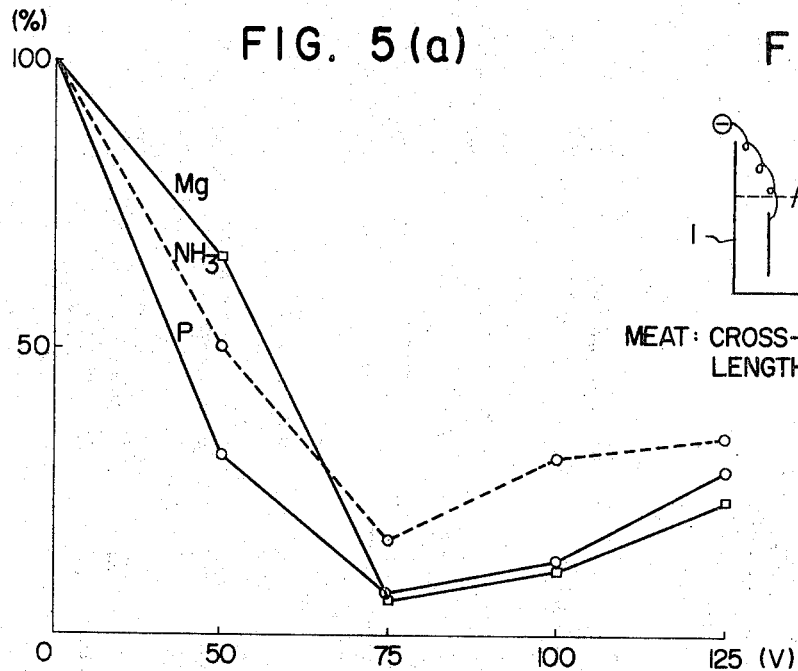
FIG. 5(a)
FIG. 5(b)
MEAT: CROSS-SECTION, 3×4cm
LENGTH, 10cm
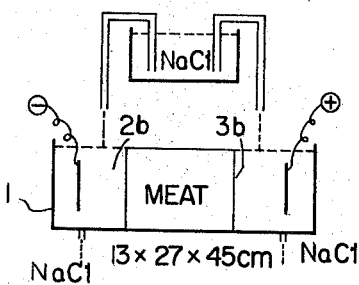
FIG. 6
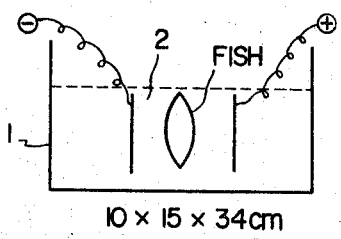
FIG. 7
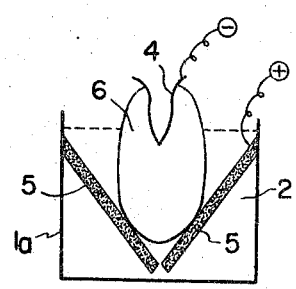
FIG. 8(a)
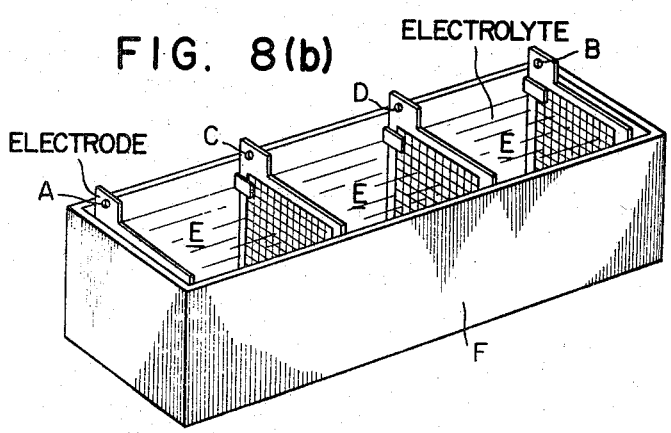
FIG. 8(b)

United States Patent Office 3,547,657
Patented Dec. 15, 1970

3,547,657
ELECTRICAL PROCESSING OF MARINE PRODUCTS
Shigeru Otsuka, Toyonaka-shi, and Hiromitsu Osada, Tarazuka-shi, Japan, assignors to Toyo Seikan Kabushiki Kaisha, Tokyo-to, Japan, a joint-stock company of Japan
Filed Feb. 26, 1968, Ser. No. 708,227
Int. Cl. A23b 3/00
U.S. Cl. 99—111                          5 Claims

ABSTRACT OF THE DISCLOSURE

A direct current is passed through a marine product such as fish meat immersed in an electroconductive liquid medium to cause the contents of undesirable substances, principally phosphoric acid, magnesium, and volatile bases (including ammonia) contained in the marine product to be greatly reduced by electrophoretic action. This process has been found to prevent the formation of struvite in the marine product when it is canned and even after a long period of storage and simultaneously to pre-cook the product without subsequent discoloration or deterioration in flavor and odor.

BACKGROUND OF THE INVENTION

This invention relates generally to the field of processing and canning of food products, particularly of marine products. more specifically, the invention concerns a new technique for processing marine products such as fish meats by passing direct current therethrough with the objects of removing undesirable salts from the meats, improving the flavor, and pre-cooking the meats.

In cooking and canning of marine products as practiced heretofore, the presence of inorganic salts and organic bases of no value or low value from the viewpoint of nutrition has been the cause of deleterious occurrences within the products, such as formation of struvite (inorganic phosphate crystals (ammonium magnesium phosphate) in the form of broken glass or sand), discoloration, and production of unpleasant odors. Such undesirable occurrences have frequently led to complaints and claims.

Of these occurrences, the formation of struvite crystals is serious and is at present the cause of the largest number of claims relating to canned marine products. This formation most frequently occurs particularly in canned salmon, tuna in oil and in brine, crab and shrimp, and cuttle fish.

While the crystals of struvite have the appearance of broken glass, they are crystals of ammonium magnesium phosphate ($MgNH_4PO_4 \cdot 6H_2O$), which is harmless to the human body.

The prevention of formation of struvite (sometimes, but rarely, called guanite) crystals has heretofore been difficult in spite of the long history of discoveries and research relating thereto as indicated below. These crystals were discovered by various investigators even before their discovery in canned marine products. According to J. E. Meller, records indicate that these crystals were discovered near Hamburg in 1848 by Ulex, in decomposed urea in 1858 by Ludwig, and in guano in 1861 by Prevostaye.

On one hand, Robinson in 1889 discovered these crystals in culture media of micro-organisms; Scudder in 1926 made a report on this subject; and Amano in 1950 found that struvite crystals can be formed not only in the culture media of aerobic micro-organisms, which cause alkalinity in the culture ground, but also in the case of anaerobic micro-organisms and that these crystals, furthermore, can be formed also in dried marine products and in fish sauce.

According to available reference bibliography, the first report on research relating to struvite crystals in canned marine products was that made in 1917 in the U.S.A. on the discovery thereof in canned tuna. Thereafter, struvite crystals were detected in various canned marine products, and numerous reports on research relating to the causes of the formation of struvite crystals, the mechanism of their growth, and method of preventing their formation have been issued, the principal findings being as follows.

Purcell and others reported on canned shrimp in 1922 in England, and James thereafter reported on canned salmon and crab. In Japan, Kimura analyzed struvite in the canned salmon which had become a problem at the time in England because of struvite and confirmed that this struvite was $MgNH_4PO_4 \cdot 6H_2O$. Kimura further found that struvite existed also in canned "yamato-ni" (meat stewed in soy bean sauce). Matsuike and others studied struvite in canned salmon in 1939 and claimed that the use of brine containing seat water or magnesium salts is the cause of struvite formation.

Also in 1939, Clough issued a warning that the occurrence of crystals in canned salmon was tending to increase in the preceding years. He also reported that, of the canned salmon in which struvite was found, 60 percent was king salmon, followed by red salmon, and struvite was rarely found in coho, pink, and chum salmons, and that the struvite formation occurred with the elapse of time, occurring in almost all canned salmon after being stored for two years.

In 1938, Era studied canned tuna in oil and reported that there is little struvite formation at a pH value of 6.0 or less, but at a pH value of 6.3 or higher there is much formation, that this struvite formation varies with the manner in which the tuna is caught and is less in canned tuna caught in summer, and that struvite easily forms in canned tuna of low fat and oil content. In 1940, Nagai studied struvite formation in canned salmon and reported that this formation has no relation to the use of sea water or common salt and occurs more readily when the raw material is fresh and that crystal formation occurs readily when the canned salmon is thoroughly cooled after sterilization.

From about 1956, research relating to the causes of struvite formation and to methods of prevention thereof has been carried out in Jajan by Tanigawa and others and Yamada. Yamada, studying the phenomenon in canned crab, has found that it is not affected by whether or not sea water is used and that it does not have much relation to the rate of cooling after sterilization. He has also confirmed that when the storage temperature of canned crab is held at from 40 to 50 degrees C., there is much formation of crystals, which, moreover, are large, and that crystals readily form when the sterilization temperature or heat curing temperature is high. Yamada has further shown that by adding, to the contents of canned crab meat, citric acid of a quantity (from 0.07 to 0.13 percent) such that it will not lower the pH value, magnesium is sequestered by the chelation and has demonstrated the resulting effectiveness in preventing struvite formation.

Tanigawa and others have reported that rapid cooling and the addition of chelating agent such as hexametaphosphate of a quantity such that it will not impair the food flavor of the product are necessary for the prevention of struvite formation.

In various other countries research on canned salmon is being carried out, but differing results depending on the researcher have been reported. For example, in 1933 Carter reported that slow cooling after sterilization promotes the formation of struvite in canned salmon, while Bedford has reported, also relative to canned salmon, that the formation of struvite varies with factors such as the physiological peculiarities of the raw material fish, method of cooling, and the retort temperature. Wood has reported that the action of micro-organisms during storage or during storage or during processing probably is the cause of the phenomenon in canned crustacean.

Furthermore, Andrew has reported that the crystal formation in canned lobster clearly increases with the number of processing steps in which sea water is used, and the size of the crystals also increases with this number. He has also reported that the crystals are not formed when sea water is not used and grow rapidly when magnesium salts and ammonium salts (particularly Mg salts) are added. Andrew has further stated that one method of preventing crystal formation is possibly to add a substance such as acetic acid or citric acid up to a point at which crystals will not form.

The Shizuoka-Ken, Kanzume Kyokai Gijutsubu (The Canners Association of Shizuoka Prefecture, Technical Research Division) of Japan is actively undertaking research relating to canning of tuna and has reported that each of citric acid (0.7 percent), malonic acid (0.6 percent), acetic acid, and sodium pyrophosphate (0.3 percent) has prevented the formation of struvite. Nagasawa has reported that a decrease in magnesium and phosphorous of from 20 to 30 percent occurs during the steam cooking of tuna and that addition of from 0.05 to 0.25 percent of phytic acid is very effective in preventing struvite formation.

All of the methods which are being advocated at present as being effective in preventing the formation of struvite depend on the addition into food products of so-called metal chelating (multi-valence-coordinating) agents, such as citric acid, phytic acid, and pyrophosphoric acid or their salts. These methods contemplate the suppression of struvite formation by fixing magnesium, which is one of the elements in the composition of struvite, as a chelation product thereof by the addition of such agents.

By a method of this nature, however, a considerable crystallization preventing effect is attained during the initial period of storage, but during a long period of storage, the chelation effect seems to be lost because of changes or deterioration in the additive agent and other causes, and there is even the possibility of the agent becoming an accelerator.

We have previously reported that adenosine triphosphate (ATP), ribonucleotides, and ethylenediaminetetraacetic acid (EDTA) or its salts are effective in preventing struvite formation within a test tube. However, we have found as a result of actual canning tests that, on the contrary, ribonucleotides causes the formation of large crystals. We have found further that when a chelating agent containing phosphorous is added, there may be a temporary desirable effect, but over a long period of storage, there is a possibility of decomposition of the additives and thereby of formation of large crystals as in the case of ribonucleotides.

In the prevention of struvite formation through the use of chelating agents, a considerable quantity of each agent, because of the nature of its action, must be added, and in some cases restrictions are imposed on the use of these agents by the regulations in various countries governing food product additives. Thus, the number of such additives which can be used in practice at present cannot be said to be large.

SUMMARY OF THE INVENTION

It is an object of the present invention to solve the above described problems by providing a new technique for electrically processing marine products with the objects of removing undesirable salts from the products, improving the product flavor.

Briefly summarized, the objects of the invention can be achieved by a process which comprises, generally, immersing a marine product such as fish meat in a suitable medium in a pretreatment stage prior to food processing and applying a D-C potential to the product thus immersed thereby to extract and remove electrically (electrophoretically) the salts in the marine product, to lower fully the concentrations of the ions of magnesium, ammonia, and phosphoric acid, and thereby to prevent crystallization of struvite.

We have found that, in addition to prevention of struvite formation, the process of the invention has the further effects of effectively preventing discoloration by removing other inorganic ions and of improving the flavor of fish meats of relatively low degree of freshness by removing organic bases (amines), which are present as positive ions and cause deterioration of taste, and, at the same time, the process accomplishes pre-cooking of the product due to the accompanying heat.

BRIEF DESCRIPTION OF THE DRAWINGS

The nature, principle, details, and utility of the invention will be more clearly apparent from the following detailed description beginning with a general consideration and concluding with specific examples of procedures and results illustrating preferred embodiments of the invention.

In the accompanying drawings:

FIGS. 1(a), 2(a), 3(a), 4(a), and 5(a) are graphical representations indicating the variations in the contents of substances such as P and Mg in fish meat due to electrical processing according to the invention as described in Examples 1, 2, 3, 4, and 5, respectively, set forth hereinafter.

FIGS. 1(b), 2(b), 3(b), 4(b), 5(b) and 6 are diagrammatic elevational views showing examples of electrical processing apparatus used in Examples 1 through 6, respectively;

FIG. 7 is a diagrammatic elevational view, in cross section, showing one example of practice of the invention as a continuous process; and FIGS. 8(a) and 8(b) are respectively a side view as well as a perspective view showing examples of the device used for continuous type process and batch type process.

DETAILED DESCRIPTION

Figure 1A:
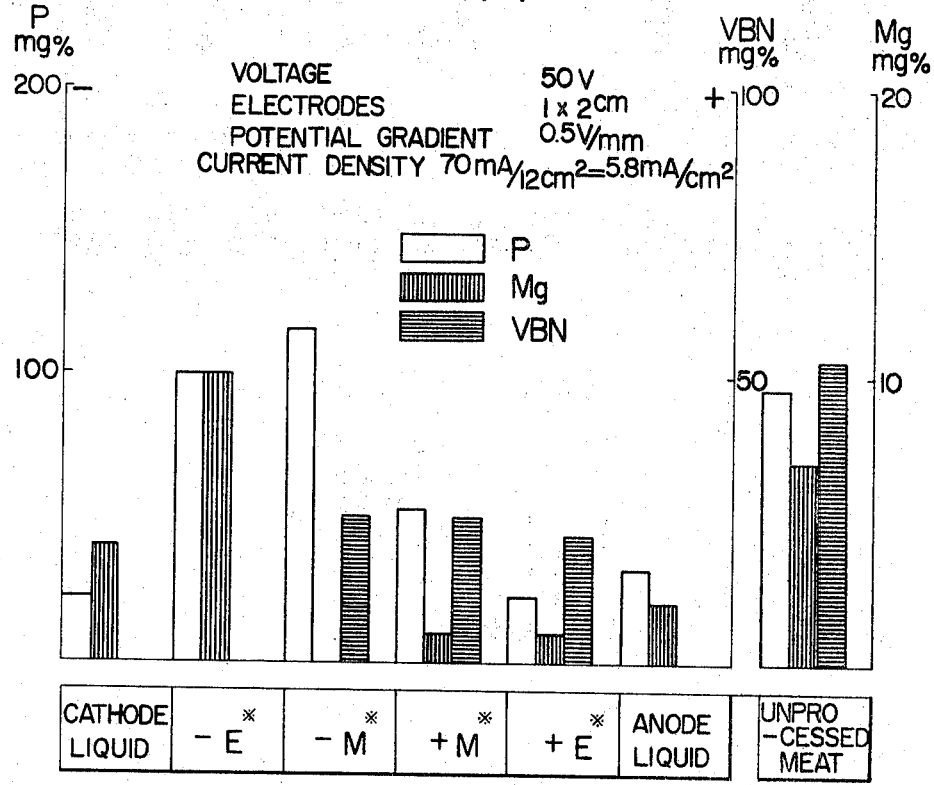

The process of the invention involves one kind of electrophoresis in which the marine product such as a fish meat, for example, constitutes a stationary element and in which the substances (electrolytes) of either positive or negative charge or ions within the fish meat are caused to migrate (undergo phoresis) toward respective negative and positive electrodes provided at two ends of the stationary element and finally to be removed out of the stationary element (fish meat).

The velocity of the above mentioned migration is affected by the voltage and current and by the strength (magnitude of ionization degree) of the electrolyte itself, the shapes and sizes of the ions, and the state of fish meat structure constituting the stationary element. Therefore, by adjusting the voltage and current applied from the outside, it should also be possible to extract and remove only the objective ions.

Since inorganic ions and organic bases, in general, are strongly electrically charged, it is possible to remove only these substances by appropriately selecting the voltage, current, and time of application of electricity and to cause the flavor imparting ingredients, nutritious ingredients, and other useful organic weak electrolytes and amphoteric electrolytes such as amino acids to remain within the meat thereby to produce a food product of good quality.

The current per unit time can be easily controlled by adjusting the ionic strength of the electrolyte in the neighborhood of the electrodes.

In the production of canned tuna in brine, for example, it is a common practice to steam cook the meat for 3.5 hours or even longer at 102 to 105 degrees C. (1 to 3 p.s.i.) as a pretreatment. Since it is possible by the process of the present invention to accomplish heat curing at the same time, the time for pretreatment is not required, and the conventional steam cooking process step becomes unnecessary, whereby this time can be employed for carrying out the instant process.

More specifically, since raw tuna meat has an electrical resistance, it is possible to cause generation of heat by selecting the process conditions and thereby to cause pre-cooking of the meat.

For example, raw tuna meat has a resistance of approximately 4 kilo-ohms through a cross section of 12 cm.$^2$ per 10 cm. of length. Moreover, the raw meat acquires a uniform, excellent degree of precooking when direct current under conditions suitable for desalting as described hereinafter, i.e., 100 volts and a number of amperes or more, if required, is passed through the meat, there being no special necessity of adjusting the voltage and current.

We have never observed any instance of deleterious effects such as deterioration of a marine product due to the process of the invention. We believe, furthermore, that the present invention is applicable not only to tuna meat but also to meats of salmon, salmon-trout, crab, and mollusk to achieve the same effective results.

In order to indicate still more fully the nature and utility of the invention, the following specific examples of practice are set forth, it being understood that these examples are presented as illustrative only and that they are not intended to limit the scope of the invention.

EXAMPLE 1

Figure 1B:
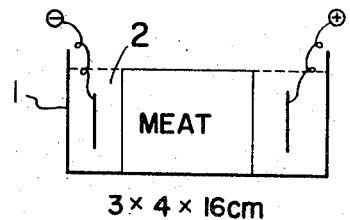

Electrical processing of tuna 100 grams (g.) of a cut of tuna sold on the market was immersed in a 0.1-percent NaCl solution 2 in an electrical processing apparatus 1 as indicated diagrammatically in FIG. 1(b), and direct current at 50 volts was passed therethrough for 5 hours. The essential process conditions were as follows: voltage, 50 volts; electrodes, 1 x 2 cm.; potential gradient, 0.5 volt/mm.; and current density, 70 ma./12 cm.$^2$=5.8 ma./cm.$^2$.

The resulting variations in the contents of phosphorous (P), magnesium (Mg), and volatile base-nitrogen (VBN) were as indicated in FIG. 1(a).

EXAMPLE 2

Electrical processing of steam-cooked tuna

Figure 2A:
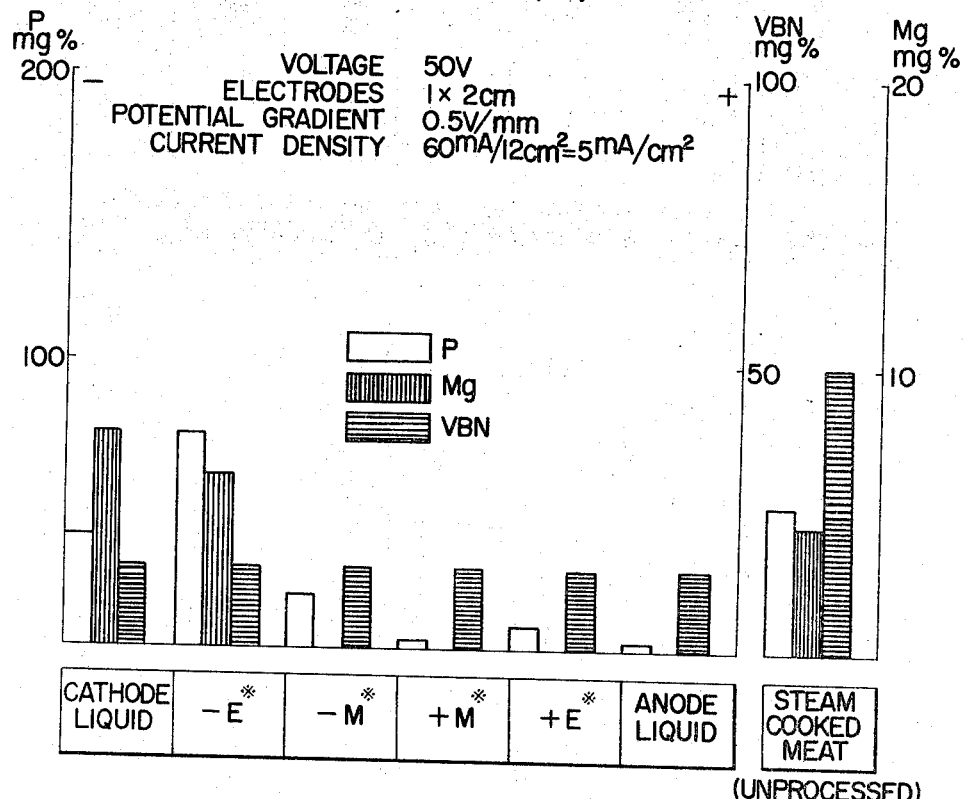
Figure 2B:
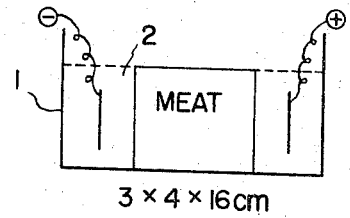

A cut of tuna sold on the market was steam-cooked for 25 minutes at 100 degrees C. 100 grams of this steam-cooked meat was immersed in a 0.1-percent NaCl solution 2 in an electrical processing apparatus 1 as diagrammatically indicated in FIG. 2(b), and direct current at 50 volts was passed therethrough for 5 hours. The essential process conditions were as follows: voltage, 50 volts; electrodes, 1 x 2 cm.; potential gradient, 0.5 volt/mm.; and current density, 60 ma./12 cm.$^2$=5 ma./cm.$^2$. The resulting variation in the contents of phosphorous (P), magnesium (Mg), and volatile base-nitrogen (VBN) were as indicated in FIG. 2(a).

EXAMPLE 3

Electrical processing of tuna

Figure 3A:
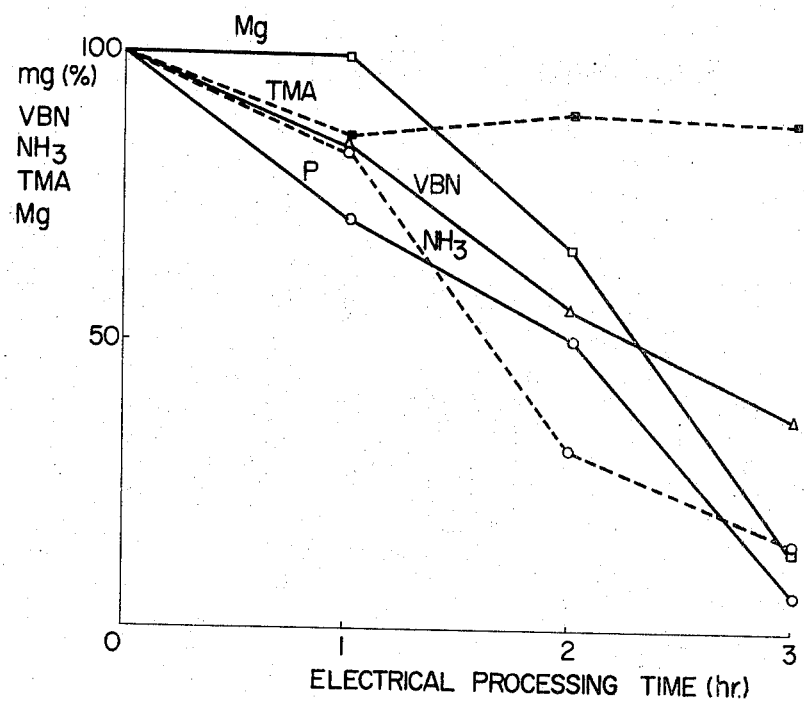
Figure 3B:
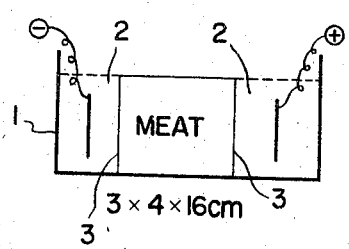

Four cuts of tuna meat, each of 100-gram weight, were used as samples, three of which were separately placed in a vessel and respectively processed for 1, 2, and 3 hours at 100 volts applied by an electrolyte 2 (0.1-percent NaCl solution), partition walls, glass-filters, or ion-exchange membranes 3 being placed between each of these three samples and the electrolyte to prevent direct infiltration of the electrolyte into the meat as indicated in FIG. 3(b).

The essential process conditions were as follows: voltage, 100 volts; electrodes, 1 x 2 cm.; potential gradient, 1.0 volt/mm.; and current density, 24 ma./cm.$^2$ (first 1 hour), 37 ma./cm$^2$ (second 1 hour), and 18 ma./cm.$^2$ (last 1 hour).

The resulting variations in the contents of VBN, NH$_3$, trimethylamine (TMA), P, and Mg were as indicated in Table 1 and FIG. 3(a).

TABLE 1

[Unit: mg. percent]

| Time (hr.): | VBN | NH$_3$ | TMA | P | Mg |
|---|---|---|---|---|---|
| 0 [1] | 30.0 | 21.1 | 8.9 | 378.8 | 13.1 |
| 1 | 25.2 | 17.6 | 7.6 | 269.6 | 13.0 |
| 2 | 16.8 | 6.8 | 8.0 | 191.9 | 8.7 |
| 3 | 11.2 | 3.2 | 7.9 | 26.1 | 1.9 |

[1] Raw meat.

EXAMPLE 4

Electrical processing of tuna

Figure 4A:
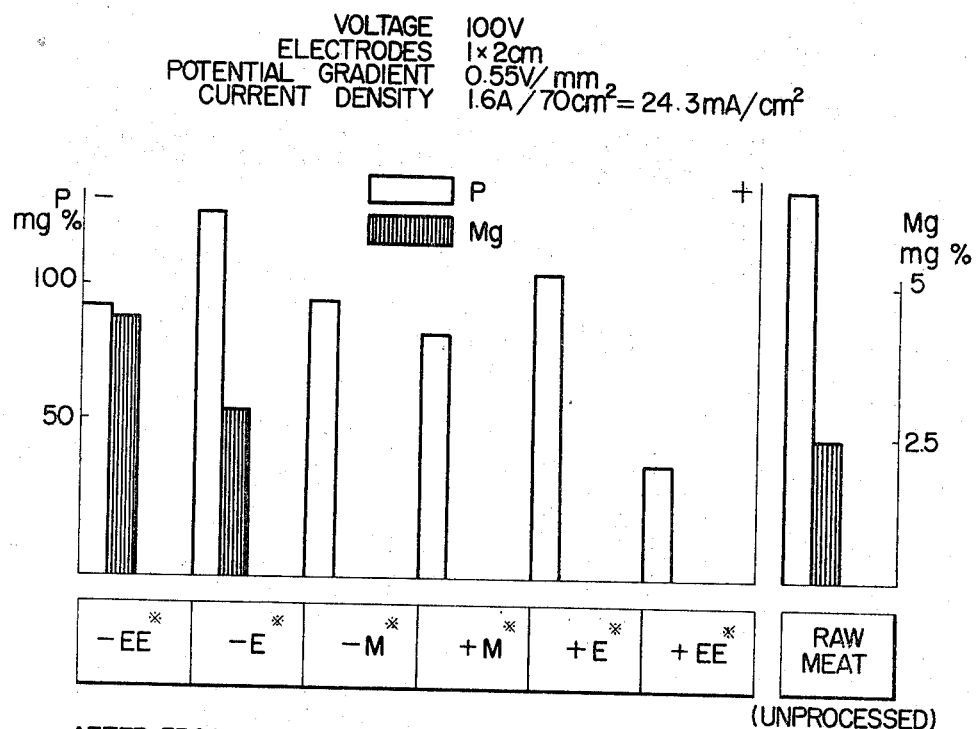
Figure 4B:
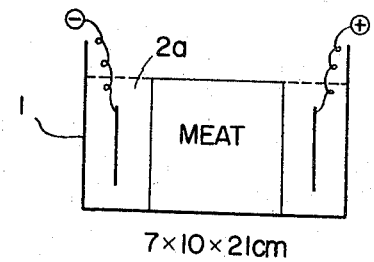

A cut of approximately 1 kg. of tuna sold on the market was immersed in a 1-percent NaCl solution 2a in an electrical processing apparatus 1 as indicated in FIG. 4(b) and then electrically processed at 100 volts for 3 hours. The essential process conditions were as follows: voltage, 100 volts; electrodes, 1 x 2 cm.; potential gradient, 0.55 volt/mm.; and current density, 1.6 a./70 cm.$^2$=24.3 ma./cm.$^2$. To each 90 grams of the meat, 60 grams of a 30-percent NaCl solution was added, and heat sterilization at 113 degree C. was carried out for 70 minutes.

The variations of the contents of P and Mg resulting from the electrical processing were as indicated in FIG. 4(a).

EXAMPLE 5

Electrical processing of tuna

Cuts of tuna meat having a 3 x 4-cm. cross section, 10-cm. length, and 150-gram weight were immersed in a 0.1-percent solution 2 of sodium chloride provided in the processing trough, as shown in FIG. 5(b), and direct current of 50, 75, 100 and 125 volts were passed therethrough for 2 hours respectively.

As a result, the application of electricity of 75 volts (potential gradient: 7.5 volts/cm.) gave the best and sufficient removal of phosphate, magnesium and ammonia, thereby respectively removing 93, 94.2 and 83.2 percent of the constituents in the raw meat.

EXAMPLE 6

Test canning of tuna processed by steam cooking and electrical processing

The steam cooking was carried out at 103 degrees C. for 2 hours, after which the fish was left overnight, cleaned, and canned in the conventional manner.

On the other hand, the electrical processing was carried out by removing the internal organs and bones of the tuna, immersing the fish in a 0.5-percent NaCl solution 2b between filter walls 3a in the processing trough 1 as indicated in FIG. 6, applying 100 volts for three hours therethrough, leaving the fish overnight, cleaning the same, and then canning the same in the conventional manner.

The essential conditions of the electrical processing were as follows: voltage, 100 volts; electrodes, 1 x 2 cm.; potential gradient, 0.55 volt/mm.; and current density, 53.3 ma./cm.$^2$.

The contents of P and Mg in the raw meat, steam-cooked meat, and the electrical processed meats were as shown in Table 2.

TABLE 2

[Unit: mg. percent]

| Kind of meat | P | Mg |
|---|---|---|
| Raw | 280 | 26 |
| Steam cooked | 280 | 24 |
| Electrically processed | 300 | 20 |

The results of inspection after three months of storage of the tuna meat thus canned were as indicated in Table 3.

TABLE 3
[Unit: mg. percent]

| Kind of meat | Total quantity | pH | H₂S | VBN | Flavor | Struvite |
|---|---|---|---|---|---|---|
| Raw meat | | | 0 | 23.8 | | |
| Steam-cooked, canned. | 353 | 5.8 | 0.108 | 51.2 | Good | ++++ |
| | 354 | 5.8 | | | do | ++++ |
| | 353 | 5.9 | | | do | ++++ |
| | 346 | 6.0 | | | do | ++++ |
| | 348 | 5.8 | | | do | ++++ |
| Electrically processed, canned. | 354 | 5.9 | 0.445 | 42.7 | Good | - |
| | 355 | 5.9 | | | do | - |
| | 353 | 5.8 | | | do | - |
| | 357 | 5.9 | | | do | - |
| | 359 | 6.0 | | | do | |

EXAMPLE 7

An apparatus comprising a processing trough 1, solution 2 and fish as shown in FIG. 7 was used.

A cut of tuna meat having a 3 x 4-cm. cross section 10-cm. length, and 150-gram weight was immersed in a 0.1-percent solution of NaCl, and a direct current of 100 volts and 2 amperes was passed therethrough for 3 hours. The potential gradient was 10 volt/cm., and the current density in terms of the surface area of the meat was 83 ma./cm.²

As a result, the contents of the phosphoric acid, Mg+Ca, and volatile bases (including ammonia) were reduced to values approximately ⅛, ¹/₁₀, and ⅓ respectively, for those before the electrical processing, as indicated in Table 4.

TABLE 4

| | Phosphoric acid, (mg. percent) | Mg.+Ca. (mg. percent) | Volatile amines (incl. ammonia) (mg. percent) | Flavor | Structure state |
|---|---|---|---|---|---|
| Before electrical processing | 92.8 | 3.84 | 22.4 | Odor of initial spoilage (amine odor) | Raw meat. |
| After electrical processing | 10.6 | 0.33 | 7.0 | Fresh boil cured odor | Pre-cooked. |

Furthermore, since the amines, which are considered to be the cause of the unpleasant odor of fish meat in the initial stages of spoilage, were removed by the process of the invention, the flavor and other characteristics of the fish meat were remarkably improved to an extent comparable to those of products processed from very fresh fish meat.

In addition, the temperature of the inner central part of the meat was raised to approximately 95 degrees C. by the above described process, whereby pre-cooking was accomplished simultaneously. A further observable feature of the process was that the fish meat structure after the process was excellent and was maintained in a state of natural precooking. Furthermore, no evidence of deterioration or other abnormal state was observable.

From the foregoing examples, it is possible to arrive at the following three conclusions.

(1) When electric current is passed through a cut of fish meat, the quantity of the $Mg^{++}$, $NH_4^+$, $PO_4^{---}$, and and volatile base-nitrogen (VBN) contained in the meat is remarkably reduced and approaches zero with elapse of processing time. (Examples 1, 2, 3, 4, and 5.)

(2) In electrical processing on a large scale, the removal of the $Mg^{++}$ is incomplete, but in spite of this, no formation whatsoever of struvite in actual canning tests is observable.

(3) From the above finding (2) the known fact that struvite formation occurs to a great degree in canned tuna when the raw material meat of relatively low degree of freshness is used, it may be concluded that the primary cause of struvite formation in canned tuna is ammonia and not magnesium as commonly thought heretofore. In any case, it is possible by the electrical processing according to the present invention to prevent fully the formation of struvite. At the same time, the quantity of ammonia removed by the process can be used as a criterion in the practice of the invention.

In the commercial practice of the invention, two general kinds of process are possible, namely, a batch process where electric current is passed simultaneously through a large number of fish carcasses, for example, and a continuous process wherein current is passed through fish carcasses as they are being conveyed along a work flow line.

In the batch process, a batch of fish carcasses, for example, is placed in a vessel and electrically processed in the manner described above. We have found that more effective results can be obtained in this process by aligning the fish in substantially parallel arrangement and passing the electric current laterally from side to side of each fish rather than causing in migration in the head-to-tail direction thereof.

In one example of a continuous process as indicated in FIG. 8(a), the vessel of the electrical processing apparatus is in the form of a long trough 1a containing therealong electrodes 5 of one polarity forming a passageway of V-shaped cross section. A continuous stream of fish carcasses 6, after removal of internal organs and other undesired parts theref, is caused to travel along the V-shaped passageway, a traveling stainless steel electrode 4 of the other polarity being inserted in and along the body cavities of the fish and traveling together with fish.

A dilute NaCl solution or, if necessary, some other electrolyte of high boiling point is placed in the trough 1a, and suitable voltage is applied to the electrodes 4 and 5 to accomplish the electrical processing according to the invention. The degree of this electrical processing can be controlled, of course, by suitably selecting the process conditions such as the length of the trough 1a, the traveling speed of the fish, and the applied voltage. Operation in the case of using the apparatus shown in FIG. 8(b) will be described as follows:

The apparatus in FIG. 8(b) comprises a trough F, an anode A, a cathode B, an anion exchange membrane, a cation exchange membrane, and an electrolye E consisting of a salt-solution containing about 0.1% NaCl.

When a fish-meat is put between the membranes C and D and a D.C. voltage is applied between the electrodes A and B, anion produced out of the fish-meat passes through the membrane C and exhausted in the space between the membrane C and the electrode A. The cation inbetween the electrode A and the membrane C cannot pass through the membrane C, because the anion exchange membrane hinders passing of the cation, so that said cation stays in between the electrode A and the membrane C and does not penetrate into the fish-meat. Similarly, cation produced from the fish-meat passes through the membrane D and enters into the space between the membrane D and the electrode B. The anion between the membrane D and the electrode B does not pass through the membrane D and accordingly does not penetrate into the fish-meat.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

We claim:
1. A process for electrically processing marine products which comprises placing the marine product in a vessel in which current is passed through the marine product by interposing ion-exchange membranes between the marine product and respective bodies of an electroconductive medium liquid in said vessel thereby to prevent direct infiltration of said liquid into the marine product, placing electrodes respectively in contact with said bodies of the liquid, and applying a D.C. voltage for a specific time to said electrodes, thereby to remove undesirable salts therewithin.

2. A process for electrically processing marine products which comprises placing the marine product in a vessel in which current is passed through the marine product by interposing liquid-absorbing structures between and in direct contact with marine product and respective electrodes, causing an electroconductive liquid to drip onto and pass through said structures, and applying a D-C voltage for a specific time to said electrodes thus causing passing of said liquid through said structures, thereby to remove undesirable salts therewithin.

3. In the processing of marine products for canning thereof, the process which comprises placing the marine product in a vessel in which current is passed through the marine product by interposing ion-exchange membranes between the marine product and respectvie bodies of an electroconductive medium liquid in said vessel thereby to prevent direct infiltration of said liquid into the marine product, placing electrodes respectively in contact with said bodies of the liquid, and applying a D-C voltage for a specific time to said electrodes, thereby to remove undesirable salts therewithin.

4. In the processing of marine products for canning thereof, the process which comprises placing the marine product in a vessel in which current is passed through the marine product by interposing liquid-absorbent structures between and in direct contact with the marine product and respective electrodes, causing an electroconductive liquid to drip onto and pass through said structures, and applying a D-C voltage for a specific time to said electrodes thus causing passing of said liquid through said structure thereby to remove undesirable salts therewithin.

5. Apparatus for continuous electrical processing of a marine product comprising a trough structure establishing a work flow line, a first electrode of one polarity disposed longitudinally in said trough structure for continuously and electrically contacting said marine product, a second electrode of opposite polarity for continuously and electrically contacting the marine product at a part thereof remote from said first electrode, means to cause the marine product to travel in a stream along said work flow line between and in contact with said first and second electrodes, an electroconductive fluid medium contained in the trough structure and enclosing the marine product immersed therein as it thus travels, and electrical power supply means to apply D-C voltage to the first and second electrodes thereby to pass a direct current through the marine product as it thus travels along the work flow line.

References Cited

UNITED STATES PATENTS

| | | | |
|---|---|---|---|
| 657,207 | 9/1900 | Washburn | 99—253 |
| 1,102,769 | 7/1914 | Lincoln | 99—233X |
| 1,231,883 | 7/1917 | Hanssen | 99—253 |
| 2,299,088 | 10/1942 | Griffith | 99—233X |
| 2,870,025 | 1/1959 | Fellers et al. | 99—111X |
| 2,979,411 | 4/1961 | Pircon | 99—233X |
| 3,084,113 | 4/1963 | Vallino | 204—130X |
| 3,230,096 | 1/1966 | Vine | 99—233 |

FOREIGN PATENTS

| | | | |
|---|---|---|---|
| 7,843 | 4/1902 | Great Britain | 99—233 |

TIM R. MILES, Primary Examiner

U.S. Cl. X.R.

99—233, 274; 204—137